(12) United States Patent
Kurt et al.

(10) Patent No.: US 10,859,048 B2
(45) Date of Patent: Dec. 8, 2020

(54) HIGH-PRESSURE FUEL PUMP

(71) Applicant: Continental Automotive GmbH, Hannover (DE)

(72) Inventors: Yavuz Kurt, Roding (DE); Julian Popov, Roding (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 144 days.

(21) Appl. No.: 16/068,584

(22) PCT Filed: Dec. 19, 2016

(86) PCT No.: PCT/EP2016/081690
§ 371 (c)(1),
(2) Date: Jul. 6, 2018

(87) PCT Pub. No.: WO2017/118564
PCT Pub. Date: Jul. 13, 2017

(65) Prior Publication Data
US 2019/0024646 A1 Jan. 24, 2019

(30) Foreign Application Priority Data
Jan. 8, 2016 (DE) .................. 10 2016 200 125

(51) Int. Cl.
*F02M 55/04* (2006.01)
*F04B 11/00* (2006.01)
(Continued)

(52) U.S. Cl.
CPC ............ *F02M 55/04* (2013.01); *F02M 59/44* (2013.01); *F02M 59/48* (2013.01); *F04B 11/00* (2013.01);
(Continued)

(58) Field of Classification Search
CPC ........ F02M 55/04; F02M 59/44; F02M 59/48; F02M 37/0041; F02M 2200/315;
(Continued)

(56) References Cited

U.S. PATENT DOCUMENTS

| 107,724 | A | * | 9/1870 | French | ................... | A47B 39/08 297/169 |
| 380,651 | A | * | 4/1888 | Fowler | ..................... | F16F 1/08 267/166.1 |

(Continued)

FOREIGN PATENT DOCUMENTS

| DE | 3307241 A1 | 9/1984 | ............. F02M 37/00 |
| DE | 102012201035 A1 | 8/2012 | ............. F02M 59/02 |

(Continued)

OTHER PUBLICATIONS

Beitz., W., "Dubbel—Tashenbuch für den Maschinenbau," 17. Auflage. Berlin : Springer-Verlag, Seite G55.—ISBN 3-540-52381-2, 4 pages (German w/ English translation), 1990.
(Continued)

*Primary Examiner* — Peter J Bertheaud
(74) *Attorney, Agent, or Firm* — Slayden Grubert Beard PLLC

(57) ABSTRACT

The present disclosure relates to pumps. Various embodiments may include a high-pressure fuel pump with: a low-pressure region with a low-pressure damper for damping pressure pulsations that occur during the operation of the high-pressure fuel pump; a damper capsule contained in the damper volume; and a spiral spring enclosed in the damper volume for imparting a preload force to at least a region of the damper capsule. The low-pressure damper has a damper volume. The damper capsule has a gas volume enclosed between two membranes.

12 Claims, 9 Drawing Sheets

(51) Int. Cl.
*F16F 1/08* (2006.01)
*F16F 1/06* (2006.01)
*F02M 59/44* (2006.01)
*F02M 59/48* (2006.01)
*F16L 55/053* (2006.01)
*F02M 59/02* (2006.01)

(52) U.S. Cl.
CPC ...... *F04B 11/0008* (2013.01); *F04B 11/0016* (2013.01); *F04B 11/0033* (2013.01); *F16F 1/06* (2013.01); *F16F 1/08* (2013.01); *F16L 55/053* (2013.01); *F02M 59/02* (2013.01); *F02M 2200/09* (2013.01); *F02M 2200/26* (2013.01); *F02M 2200/31* (2013.01); *F02M 2200/8084* (2013.01)

(58) Field of Classification Search
CPC ... F04B 11/00; F04B 11/0008; F04B 11/0033; F16F 1/06; F16F 1/08; F16F 1/328
See application file for complete search history.

(56) References Cited

U.S. PATENT DOCUMENTS

| | | | | |
|---|---|---|---|---|
| 4,596,219 | A | 6/1986 | Kemmner | 123/467 |
| 4,901,987 | A * | 2/1990 | Greenhill | F16F 1/06 267/166 |
| 6,068,250 | A * | 5/2000 | Hawkins | F16F 1/328 267/148 |
| 7,401,594 | B2 * | 7/2008 | Usui | F02M 55/04 123/447 |
| 8,262,376 | B2 * | 9/2012 | Inoue | F04B 11/0033 417/540 |
| 8,317,501 | B2 * | 11/2012 | Inoue | F04B 37/12 417/540 |
| 8,662,868 | B2 * | 3/2014 | Oikawa | F04B 37/12 417/540 |
| 8,955,550 | B2 * | 2/2015 | Oikawa | F16L 55/04 138/30 |
| 8,985,968 | B2 | 3/2015 | Matsumoto et al. | 417/415 |
| 9,109,593 | B2 * | 8/2015 | Oikawa | F04B 53/001 |
| 9,243,623 | B2 * | 1/2016 | Lucas | F04B 1/0404 |
| 9,736,470 | B2 | 8/2017 | Kosuge | |
| 2010/0209274 | A1 | 8/2010 | Oikawa et al. | 417/540 |
| 2012/0087817 | A1 | 4/2012 | Lucas | 417/540 |
| 2015/0017040 | A1 * | 1/2015 | Hishinuma | F02M 59/367 417/540 |
| 2018/0195478 | A1 | 7/2018 | Iwa et al. | |
| 2018/0223782 | A1 * | 8/2018 | Yabuuchi | F04B 11/0016 |

FOREIGN PATENT DOCUMENTS

| | | | | |
|---|---|---|---|---|
| EP | 1500811 | B1 | 1/2005 | ............ F02M 55/04 |
| JP | 2002039243 | A | 2/2002 | ............ B21F 35/00 |
| JP | 2003176760 | A | 6/2003 | ............ F02M 37/00 |
| JP | 2008014319 | A | 1/2008 | ............ F02M 55/00 |
| JP | 2010209907 | A | 9/2010 | ............ F02M 55/00 |
| JP | 2012251467 | A | 12/2012 | ............ F02M 55/00 |
| JP | 2015152621 | A | 8/2015 | ............ G03G 15/02 |
| JP | 2015152622 | A | 8/2015 | ............ G09G 5/00 |
| WO | 98/12451 | A1 | 3/1998 | ............ F16F 1/32 |
| WO | 2005/031161 | A2 | 4/2005 | ............ F02M 37/00 |
| WO | 2017/021769 | A1 | 2/2017 | ............ F02M 37/00 |
| WO | 2017/118564 | A1 | 7/2017 | ............ F02M 55/04 |
| WO | 2017/022605 | A1 | 6/2018 | ............ F02M 59/44 |

OTHER PUBLICATIONS

German Office Action, Application No. 102016200125.6, 8 pages, dated Dec. 6, 2016.
International Search Report and Written Opinion, Application No. PCT/EP2016/081690, 22 pages, dated Apr. 11, 2017.
German Office Action, Application No. 102016200125.6, 6 pages, dated Sep. 1, 2017.

* cited by examiner

HIGH-PRESSURE FUEL PUMP

CROSS-REFERENCE TO RELATED APPLICATIONS

This application is a U.S. National Stage Application of International Application No. PCT/EP2016/081690 filed Dec. 19, 2016, which designates the United States of America, and claims priority to DE Application No. 10 2016 200 125.6 filed Jan. 8, 2016, the contents of which are hereby incorporated by reference in their entirety.

TECHNICAL FIELD

The present disclosure relates to pumps. Various embodiments may include a high-pressure fuel pump which has, in a low-pressure region, a low-pressure damper for damping pressure pulsations that occur during the operation of the high-pressure fuel pump.

BACKGROUND

High-pressure fuel pumps are used in fuel injection systems by means of which fuel is injected into combustion chambers of an internal combustion engine to apply a high pressure to the fuel. In some cases, the pressure lies for example in a range from 150 bar to 400 bar in gasoline internal combustion engines and in a range from 1500 bar to 2500 bar in diesel internal combustion engines. The higher the pressure generated in the respective fuel, the lower the emissions which arise during the combustion of the fuel in the combustion chamber, which is advantageous in particular against the background of a reduction in emissions being desired to an ever greater extent.

To achieve the high pressures in the respective fuel, the high-pressure fuel pump is typically a piston pump, wherein a pump piston performs a translational movement in a pressure chamber and in so doing periodically compresses and relieves the pressure on the fuel. The non-uniform delivery that is thus realized by means of such a piston pump leads to fluctuations in the volume flow in a low-pressure region of the high-pressure fuel pump, which fluctuations are associated with pressure fluctuations in the entire system. As a consequence of these fluctuations, filling losses can occur in the high-pressure fuel pump, as a result of which correct dosing of the fuel quantity required in the combustion chamber cannot be ensured. The pressure pulsations that arise furthermore cause pump components, and for example feed lines to the high-pressure fuel pump, to vibrate, which vibrations can cause undesired noises or, in the worst case, even damage to various parts.

A low-pressure damper is therefore normally provided in the low-pressure region of the high-pressure fuel pump. The low-pressure damper operates as a hydraulic accumulator which evens out the fluctuations in the volume flow and thus reduces the pressure pulsations that arise. For this purpose, deformable elements separate a gas volume from the fuel. Such deformable elements may be formed for example as damper capsules, which have a gas volume enclosed between two membranes. If the pressure in the low-pressure region of the high-pressure fuel pump increases, the damper capsule deforms, whereby the gas volume is compressed and space is created for the superfluous liquid of the fuel. If the pressure falls again at a later point in time, the gas expands again, and the stored fuel is thus released again.

Said damper capsules are normally constructed from metal membranes, which are filled with gas and welded at the edges. To relieve a weld seam of the damper capsules of load and thus ensure the service life and functionality thereof, the damper capsules are normally preloaded within the damper volume by means of so-called spacer sleeves. Said spacer sleeves have multiple passage openings in order to be able to ensure a throughflow of the fuel. The production of said spacer sleeves, which are normally produced as deep-drawn parts or punched parts, is relatively cumbersome and therefore expensive.

SUMMARY

The teachings of the present disclosure may be embodied in a high-pressure fuel pump that is improved in this respect. For example, in some embodiments, a high-pressure fuel pump (10) for applying a high pressure to a fuel may include a low-pressure region (20) with a low-pressure damper (22) for damping pressure pulsations that occur during the operation of the high-pressure fuel pump (10). The low-pressure damper (22) has a damper volume (24), which damper volume encloses a damper capsule (26) which has a gas volume (30) enclosed in gas-tight fashion between two membranes (28), and which damper volume encloses a spiral spring arrangement (38) for imparting a preload force to at least a partial region of the damper capsule (26).

In some embodiments, the spiral spring arrangement (38) is formed with at least one helical spring (60) with multiple concentrically arranged windings (44), wherein the at least one helical spring (60) narrows in particular conically along a longitudinal axis (50) of the spiral spring arrangement (38).

In some embodiments, the spiral spring arrangement (38) is formed with at least one corrugated spring ring (42), wherein the at least one corrugated spring ring (42) has substantially the basic form of a helical spring (60) with multiple concentrically arranged windings (44), wherein the windings (44) have a corrugated form with at least two corrugation peaks (48) and at least two corrugation troughs (46), wherein in particular, the windings (44) arranged at the ends along a longitudinal axis of the corrugated spring ring (42) are formed without a corrugated form.

In some embodiments, to form lenticular passage openings (52) at an outer circumferential surface (54) of the corrugated spring ring (42), along the longitudinal axis of the corrugated spring ring (42), adjacent windings (44) are arranged such that the corrugation peaks (48) of the first winding (44a) are arranged on the corrugation troughs (46) of the second winding (44b) and/or that the corrugation troughs (46) of the first winding (44a) are arranged on the corrugation peaks (48) of the second winding (44b).

In some embodiments, the damper capsule (26) has a gas volume region (34), which is of lenticular form and which accommodates the gas volume (30) enclosed between the membranes (28), and a connecting projection (32) which encircles the gas volume region (34) and in which the two membranes (28) are connected to one another in gas-tight fashion, wherein the spiral spring arrangement (38) for imparting the preload force is arranged on the connecting projection (32).

In some embodiments, a spiral spring arrangement inner diameter (56) corresponds to a gas volume region diameter (58).

In some embodiments, at least one centering winding (62) of the spiral spring arrangement (38) for centering the spiral spring arrangement (38) in the damper volume (24) has an outer diameter (64) which corresponds to a damper volume inner diameter (66), wherein a single centering winding (62)

arranged on the at least one helical spring (60) of the spiral spring arrangement (38) or on the at least one corrugated spring ring (42) of the spiral spring arrangement (38) is, along a longitudinal axis (50) of the helical spring (60) or of the corrugated spring ring (42), arranged in particular in the center thereof, or wherein two centering windings (62) arranged on the at least one helical spring (60) of the spiral spring arrangement (38) or on the at least one corrugated spring ring (42) of the spiral spring arrangement (38) are, along a longitudinal axis (50) of the helical spring (60) or of the corrugated spring ring (42), arranged in particular at the ends thereof.

In some embodiments, the centering winding (62) is formed by a ring-shaped disk (76) which is connected, in particular welded, concentrically to a winding (44) of the helical spring (60) or of the corrugated spring ring (42).

In some embodiments, the at least one centering winding (62) has cutouts (70) which are arranged, in particular symmetrically, on an outer circumference (68) and which serve in particular for forming at least three contact circle segments (72) for making contact with a damper volume delimiting wall (74).

BRIEF DESCRIPTION OF THE DRAWINGS

Various embodiments will be discussed in more detail below by means of the appended drawings. In the drawings.

DETAILED DESCRIPTION

Figure 1:
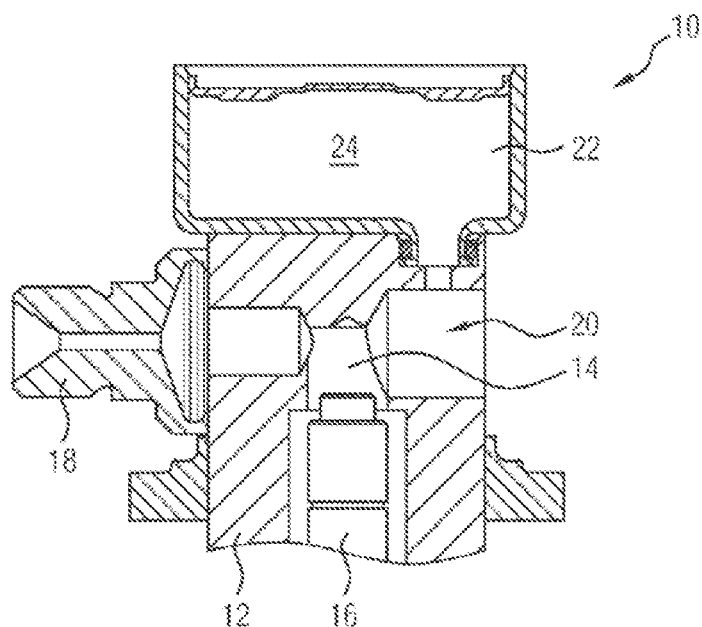
FIG. 1 is a longitudinal sectional illustration through a high-pressure fuel pump having a low-pressure damper arranged in a low-pressure region, according to teachings of the present disclosure.

Some embodiments may include a high-pressure fuel pump for applying a high pressure to a fuel has a low-pressure region with a low-pressure damper for damping pressure pulsations that occur during the operation of the high-pressure fuel pump. In some embodiments, the low-pressure damper has a damper volume, which damper volume encloses a damper capsule which has a gas volume enclosed in gas-tight fashion between two membranes, and which damper volume encloses a spiral spring arrangement for imparting a preload force to at least a partial region of the damper capsule.

In some embodiments, instead of the hitherto used spacer sleeves, which are cumbersome to produce, for imparting the preload force and for centering the at least one damper capsule in the damper volume, a spiral spring arrangement performs all of the functions of the spacer sleeve. Such a spiral spring arrangement can be produced at relatively low cost in relation to the hitherto used spacer sleeves, which are normally produced as deep-drawn parts or as punched parts.

In some embodiments, the spiral spring arrangement is formed with at least one helical spring with multiple concentrically arranged windings. For example, for this purpose, use may be made of a conventional compression spring which can ensure the required preload force for preloading the damper capsule. Such compression springs have, between the individual windings, an adequate free cross section for thus ensuring a throughflow of fuel through the helical spring.

In some embodiments, the at least one helical spring narrows conically along a longitudinal axis of the spiral spring arrangement. In this way, in relation to a cylindrical helical spring, improved centering of the helical spring can be achieved.

In some embodiments, the spiral spring arrangement is formed with at least one corrugated spring ring, wherein the at least one corrugated spring ring has substantially the basic form of a helical spring with multiple concentrically arranged windings, wherein the windings have a corrugated form with at least two corrugation peaks and two corrugation troughs. In some embodiments, the windings arranged at the ends along a longitudinal axis of the corrugated spring ring are formed without a corrugated form.

In some embodiments, instead of the hitherto used spacer sleeves, use is made of corrugated spring rings of said type, by means of which the damper capsule can likewise be preloaded. Corrugated spring rings are constructed in layered fashion in individual windings, and, owing to the corrugated form, have adequate passage openings for ensuring the throughflow of fuel through the corrugated spring ring. In some embodiments, multiple helical springs or even multiple corrugated spring rings to be arranged in the helical spring arrangement. In some embodiments, both helical springs and corrugated spring rings to be provided in the spiral spring arrangement. If, for example, multiple damper capsules are arranged in the damper volume, the provided helical springs or corrugated spring rings can act as spacers between the individual damper capsules.

In some embodiments, to be able to impart the preload force to the respective damper capsule, the provided helical spring or corrugated spring rings can be supported on a damper cover that co-defines the damper volume. In some embodiments, to form lenticular passage openings at an outer circumferential surface of the corrugated spring ring, along the longitudinal axis of the corrugated spring ring, adjacent windings are arranged such that the corrugation peaks of the first winding are arranged on the corrugation troughs of the second winding and/or that the corrugation troughs of the first winding are arranged on the corrugation peaks of the second winding. The lenticular passage openings ensure an unhindered throughflow of fuel through the corrugated spring ring.

In some embodiments, the damper capsule has a gas volume region, which is of lenticular form and which has the gas volume enclosed between the membranes, and a connecting projection which encircles the gas volume region and in which the two membranes are connected to one another in gas-tight fashion, wherein the spiral spring arrangement for imparting the preload force is arranged on the connecting projection. Thus, in particular, a weld seam on the connecting projection, by means of which weld seam the two membranes are connected to one another, is relieved of load.

In some embodiments, a spiral spring arrangement inner diameter corresponds to a gas volume region diameter. In this way, the gas volume region within the spiral spring arrangement can also extend along the longitudinal axis of the spiral spring arrangement.

In some embodiments, a centering winding of the spiral spring arrangement for centering the spiral spring arrangement in the damper volume has an outer diameter which corresponds to a damper volume inner diameter. In this way, improved centering of the spiral spring arrangement, that is to say of the at least one helical spring or of the at least one corrugated spring ring, in an installation space or damper region of the damper volume can be achieved, because an outer diameter of the spiral spring arrangement is designed to be large enough that it is equal to or only slightly smaller than the inner diameter of the installation space, that is to say of the damper volume.

For example, a centering winding may, along a longitudinal axis, be arranged centrally on the at least one helical spring or on the at least one corrugated spring ring of the spiral spring arrangement. To realize improved centering, it is however also advantageous for two centering windings to be provided, which are then, in particular along a longitudinal axis of helical spring or corrugated spring ring, arranged on the ends thereof.

In some embodiments, the centering winding is formed by a ring-shaped disk which is connected, for example by welding, concentrically to a winding of the helical spring or of the corrugated spring ring. In this case, it would for example be possible for the windings at the ends to be connected to separately formed ring-shaped disks, which are placed onto, and then fastened or welded to, the corrugated spring ring or the helical spring.

In some embodiments, the at least one centering winding has cutouts arranged on an outer circumference, which cutouts may be arranged symmetrically. These are arranged in particular so as to form at least three contact circle segments for making contact with a damper volume delimiting wall, such that, by means of the contact circle segments, centering of the spiral spring arrangement within the damper volume is made possible.

In some embodiments with ring-shaped disks are used as centering windings, at least the ring-shaped disk, or alternatively even all of the resilient windings, are provided with such cutouts in order to ensure the throughflow of fuel through the spiral spring arrangement. For example, it would be possible for only part of the outer diameter to be provided for the centering of the spiral spring arrangement, and for the rest to then be equipped with cutouts.

In some embodiments, the outer diameter of the spiral spring arrangement may be provided so as to be smaller than the damper volume inner diameter, in order to thereby also ensure a throughflow of fuel radially along the spiral spring arrangement. In this case, ring-shaped disks may be placed onto and connected to, for example, the corrugated spring ring or the helical spring, wherein the at least one ring-shaped disk has a diameter adequate for the centering of the spiral spring arrangement. Furthermore, such a ring-shaped disk may include cutouts in order to furthermore ensure the throughflow of the fuel. In some embodiments, centering may also be ensured by means of a relatively large diameter on one or more windings at any desired location within the spiral spring arrangement.

FIG. 1 is a longitudinal sectional illustration through a high-pressure fuel pump 10, which has, arranged in a housing 12, a pressure chamber 14 in which a fuel is periodically compressed and relieved of pressure by a translational movement of a pump piston 16. After compression, the highly pressurized fuel is discharged from the pressure chamber 14 via a high-pressure outlet 18. The fuel is fed to the pressure chamber 14 from a low-pressure region 20 of the high-pressure fuel pump 10. In the low-pressure region 20, there is arranged a low-pressure damper 22 which, during the operation of the high-pressure fuel pump 10, dampens pressure pulsations that occur as a result of the movement of the pump piston 16 in the pressure chamber 14.

Figure 2:
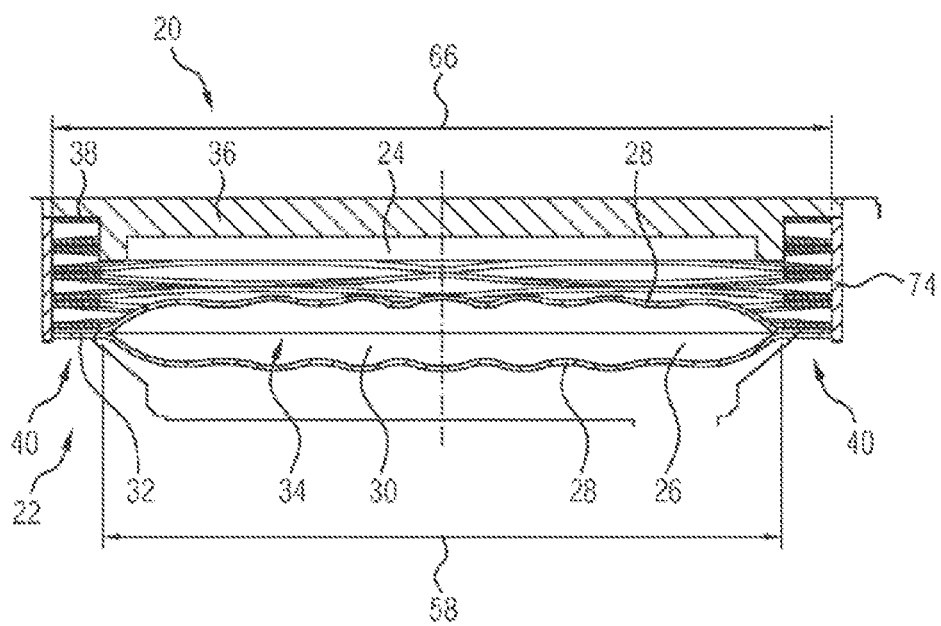
FIG. 2 is an enlarged detail illustration of the low-pressure damper from FIG. 1 with a damper capsule and with a spiral spring arrangement which preloads the damper capsule, according to teachings of the present disclosure.

For this purpose, the low-pressure damper 22 has a damper volume 24 in which, as can be seen in the detail view in FIG. 2, there is arranged at least one damper capsule 26. The damper capsule 26 is an elastic element which is constructed from two membranes 28 which, between them, have a gas volume 30 which is enclosed in gas-tight fashion. The gas volume 30 has a defined pressure and is normally defined by welding of the two membranes 28 to a connecting projection 32, and forms a corresponding gas volume region 34 of the damper capsule 26. If pressure pulsations now occur in the low-pressure region 20 of the high-pressure fuel pump 10, the damper capsule 26 can deform in the gas volume region 34, and thus dampen the pressure pulsations. If the pressure pulsations decrease, the damper capsule 26 expands again to assume its original shape.

In some embodiments, to relieve the connecting projection 32, to which the two membranes 28 are welded by means of a weld seam, of load, use has hitherto been made of spacer sleeves which, during the assembly of the low-pressure damper 22, are preloaded by means of a damper cover 36 and are then fixed as an overall assembly, for example by welding or screws. Here, the spacer sleeves have hitherto been formed such that they have multiple openings to ensure a throughflow of fuel through the damper volume 24.

In some embodiments, such as that shown in the detail illustration in FIG. 2, it is now proposed that, instead of the hitherto used spacer sleeves, a spiral spring arrangement 38 be used, which imparts the preload force to at least a partial region 40 of the damper capsule 26, specifically in particular to the connecting projection 32. In the embodiment shown in FIG. 2, only one damper capsule 26 is arranged in the damper volume 24, though it is also possible for multiple damper capsules 26 to be provided, which are then spaced apart from one another by the respective spiral spring arrangement 38.

Figure 3:
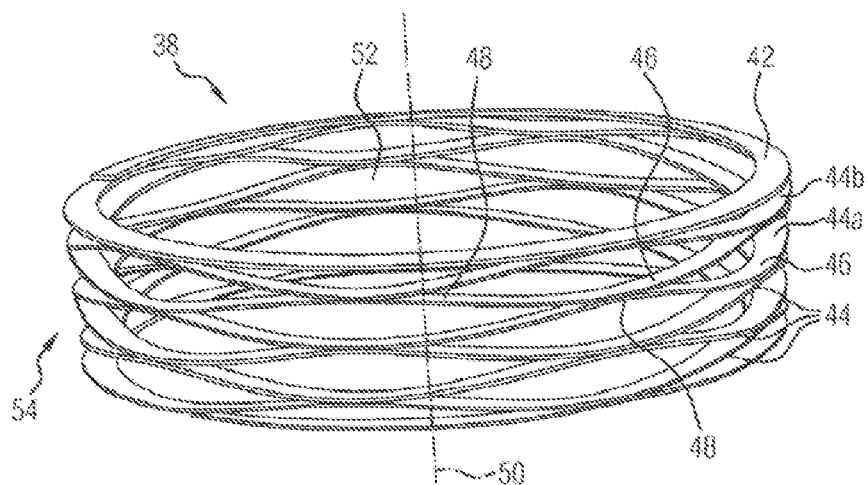
FIG. 3 is a perspective illustration of a first embodiment of the spiral spring arrangement from FIG. 2 as a corrugated spring ring, according to teachings of the present disclosure.

FIG. 3 is a perspective illustration of a first embodiment of the spiral spring arrangement 38 in the form of a corrugated spring ring 42. As can be seen in FIG. 3, the corrugated spring ring 42 has substantially the basic form of a helical spring with multiple concentrically arranged windings 44. Here, the individual windings each have a corrugated form with at least two corrugation troughs 46 and two corrugation peaks 48. Along a longitudinal axis 50 of the corrugated spring ring 42, the windings 44 arranged on the ends however do not have a corrugated shape, such that a flat termination of the corrugated spring ring 42 is realized.

As can also be seen in FIG. 3, adjacent windings 44 of the corrugated spring ring 42 are arranged such that in each case one corrugation peak 48 of a first winding 44a abuts against a corrugation trough 46 of a second winding 44b. This automatically has the effect that a corrugation trough 46 of the first winding 44a abuts against a corrugation peak 48 of the second winding 44b. By means of this arrangement of the adjacent corrugation troughs 46 and of the corrugation peaks 48, lenticular passage openings 52 are formed at an outer circumferential surface 54 of the corrugated spring ring 42.

The damper capsule 26 arranged in the damper volume 24 can therefore be preloaded by means of the corrugated spring ring 42, shown in FIG. 3, as spiral spring arrangement 38. Here, the corrugated spring ring 42 has multiple passage openings 52 in order to ensure the throughflow of fuel through the corrugated spring ring 42.

Figure 4:
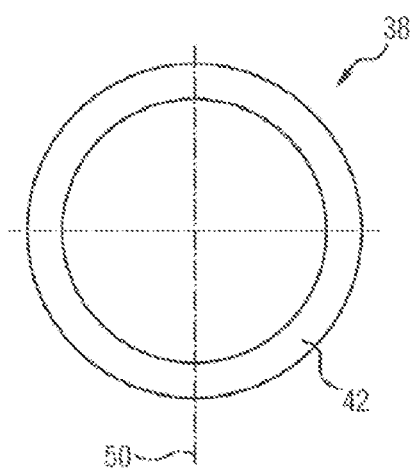
FIG. 4 shows a plan view of the corrugated spring ring from FIG. 3 from above.
Figure 5:
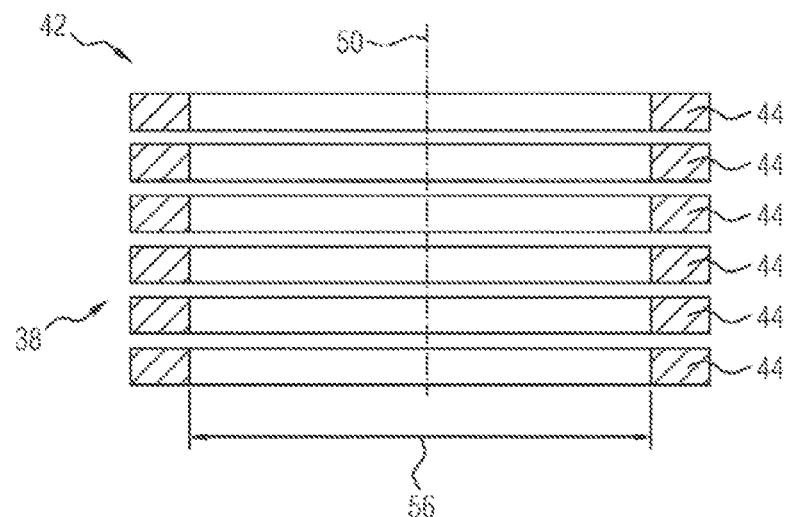
FIG. 5 shows a longitudinal sectional view through the corrugated spring ring from FIG. 3.

FIG. 4 shows a plan view of the corrugated spring ring 42 from FIG. 3, and FIG. 5 is a longitudinal sectional illustration along the longitudinal axis 50 through the corrugated spring ring 42. The corrugated spring ring 42 may have any desired number of windings 44, and it is also possible, depending on the number of damper capsules 26 that it is sought to arrange in the damper volume 24, for any desired number of corrugated spring rings 42 to be used in the spiral spring arrangement 38.

As can be seen from FIG. 5, a spiral spring arrangement inner diameter 56 corresponds at least to a gas volume region diameter 58, in order that the gas volume region 34 of the damper capsule 26 can be accommodated in the inner region of the spiral spring arrangement 38, in this case within the corrugated spring ring 42.

Figure 6:
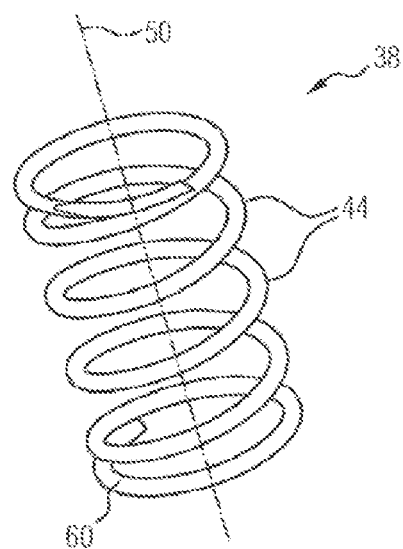
FIG. 6 shows a perspective view of a second embodiment of the spiral spring arrangement from FIG. 2 as a helical spring.

FIG. 6 shows a second embodiment of the spiral spring arrangement 38 in the form of a helical spring 60 in a perspective illustration. The spiral spring arrangement 38 may self-evidently also have a combination of helical springs 60 and corrugated spring rings 42.

Figure 7:
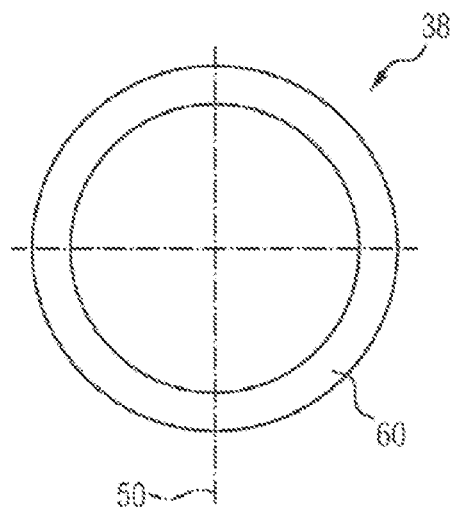
FIG. 7 shows a plan view of the helical spring from FIG. 6 from above.
Figure 8:
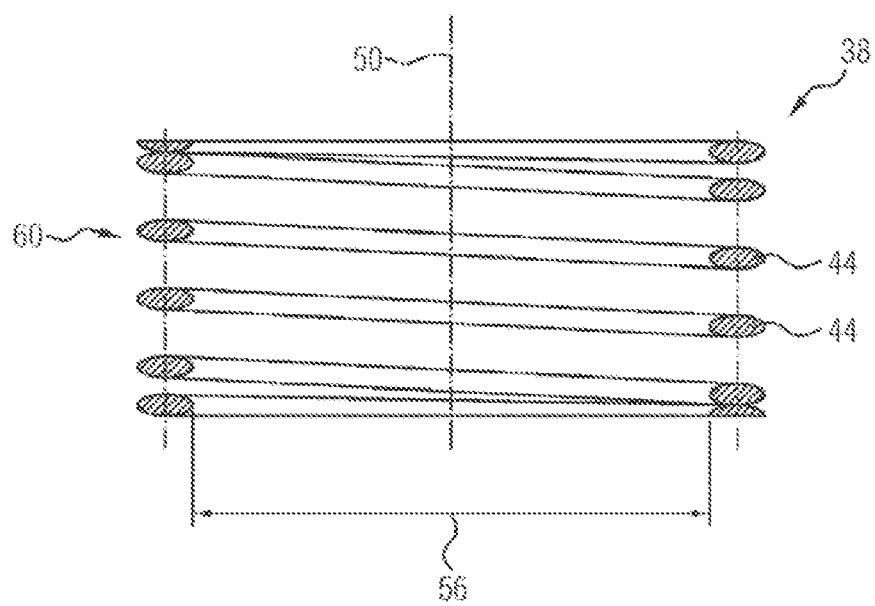
FIG. 8 is a longitudinal sectional illustration through the helical spring from FIG. 6.

FIG. 7 shows a plan view of the helical spring 60 from FIG. 6 from above, and FIG. 8 is a longitudinal sectional illustration through the helical spring 60 from FIG. 6. In this case, too, the spiral spring inner diameter 56, that is to say the inner diameter of the helical spring 60, is just large enough that the gas volume region of the damper capsule 26 can be accommodated therein. Through the use of a helical spring 60 of said type as a compression spring, which has an adequate free cross section in the form of passage openings 52 between the individual windings 44, it is likewise the case that the throughflow of the fuel through the spiral spring arrangement 38 is ensured.

Figure 9:
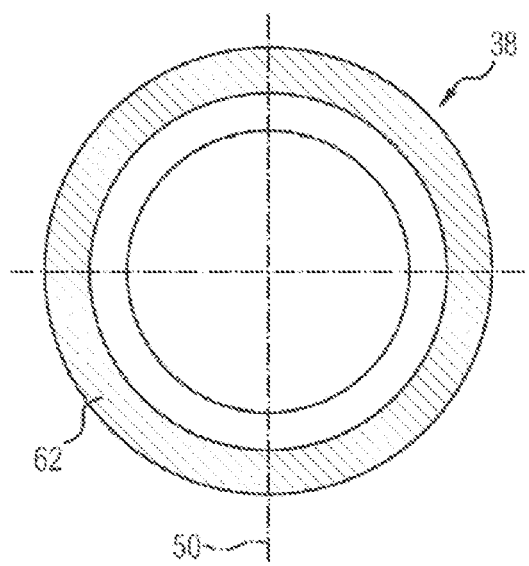
FIG. 9 shows a plan view of the spiral spring arrangement with a centering winding from above, according to teachings of the present disclosure.
Figure 10:
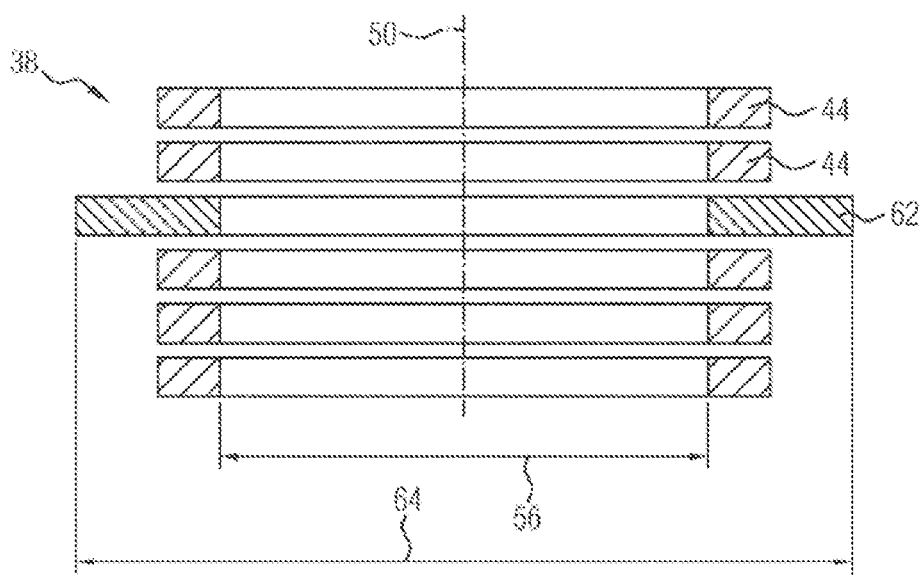
FIG. 10 is a longitudinal sectional illustration through the spiral spring arrangement from FIG. 9.

FIG. 9 shows a plan view of a spiral spring arrangement 38, which may be formed for example by a helical spring 60 or by a corrugated spring ring 42 or by a combination of the two elements. The spiral spring arrangement 38 in FIG. 9, which is shown in longitudinal section in FIG. 10, has a centering winding 62 which is arranged centrally along the longitudinal axis 50 of the spiral spring arrangement 38 and which has an outer diameter 64 which corresponds to a damper volume inner diameter 66. It is thereby possible for the spiral spring arrangement 38 to be centered in the damper volume 24.

Figure 11:
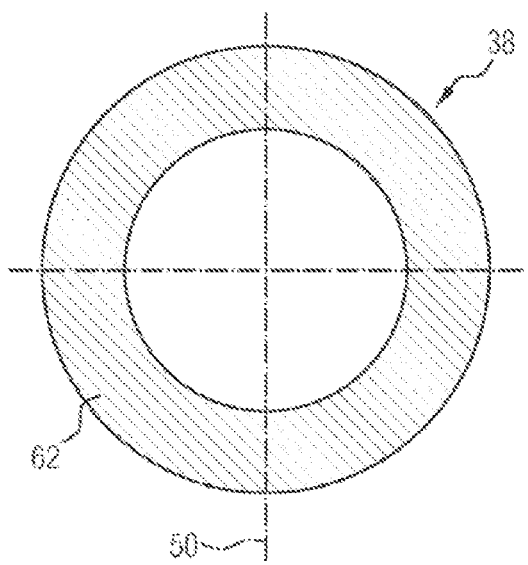
FIG. 11 shows a plan view of the spiral spring arrangement with two centering windings from above, according to teachings of the present disclosure.
Figure 12:
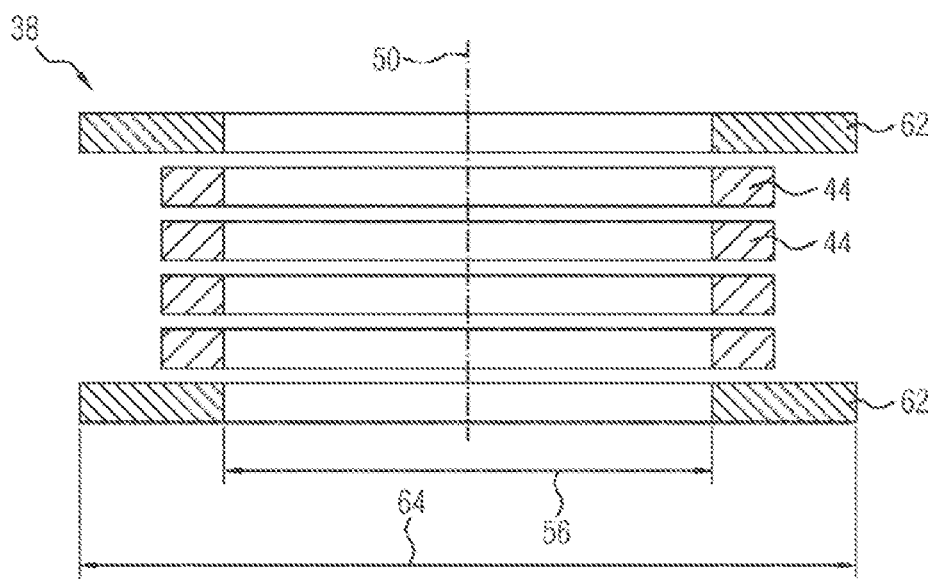
FIG. 12 is a longitudinal sectional illustration through the spiral spring arrangement from FIG. 11.

FIG. 11 shows a plan view of an alternative embodiment of a spiral spring arrangement 38, which, as can be seen in the longitudinal section in FIG. 12, has two centering windings 62 arranged on the ends. Correspondingly, centering is possible by means of one or multiple windings 44 with a larger outer diameter 64 than the other windings 44.

Figure 13:
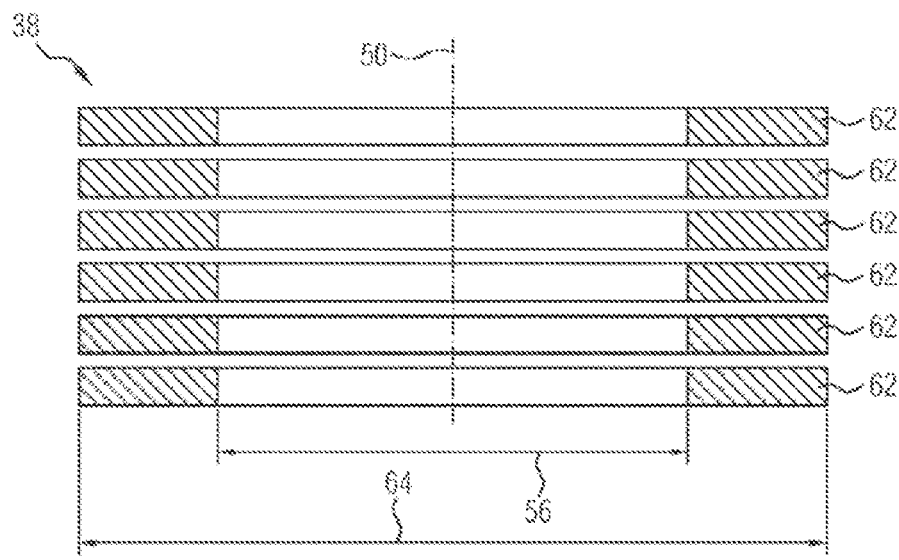
FIG. 13 is a longitudinal sectional illustration through a spiral spring arrangement in which all of the windings are formed as centering windings.

FIG. 13 is a longitudinal sectional illustration through a spiral spring arrangement 38 in which all of the windings 44 have the large outer diameter 64 and thus function as centering windings 62.

To ensure a throughflow of a fuel, the centering windings 62 may have cutouts 70 which are arranged symmetrically on an outer circumference 68 and which form passage openings for the fuel at the centering windings 62. Here, it is possible for any desired number of cutouts 70 to be provided, e.g., in an asymmetrical arrangement, wherein at least three contact circle segments 72 may be provided on an outer circumference 68 in order to ensure good centering in the damper volume 24 by contact of the at least three contact circle segments 72 with a damper volume delimiting wall 74.

Figure 14:
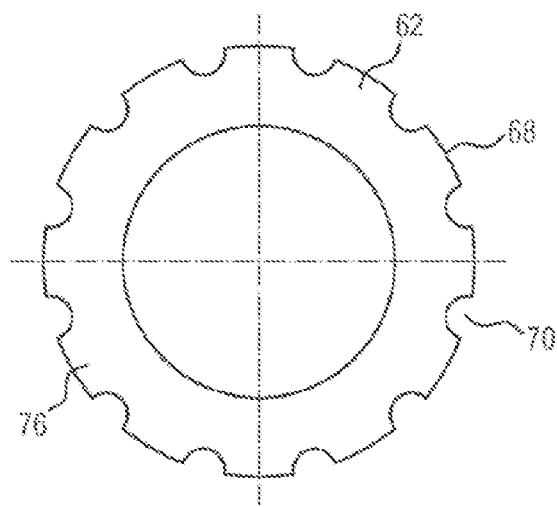
FIG. 14 shows a plan view of the spiral spring arrangement from FIG. 13 in a first embodiment from above, according to teachings of the present disclosure.
Figure 15:
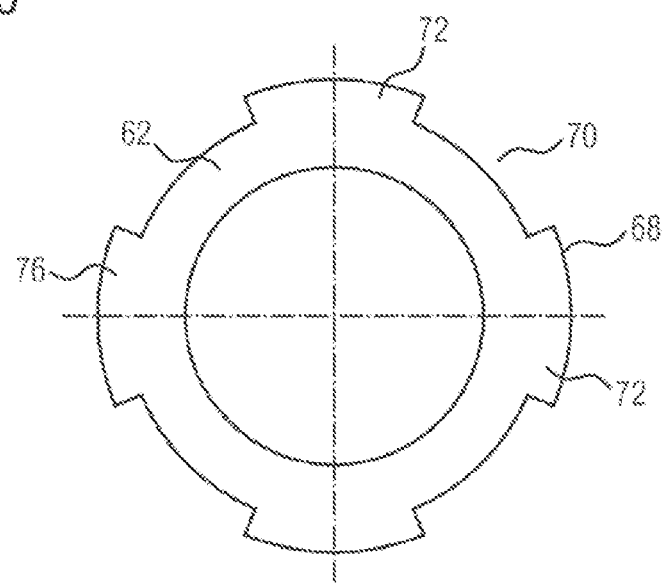
FIG. 15 shows a plan view of the spiral spring arrangement from FIG. 13 in a second embodiment from above, according to teachings of the present disclosure.

In this regard, FIG. 14 and FIG. 15 show plan views of the respective centering windings 62 of two possible embodiments with cutouts 70. Said centering windings may however also be formed as separately formed ring-shaped disks 76, which are retroactively connected concentrically to one of the windings 44 of the spiral spring arrangement 38, for example by welding.

Figure 16:
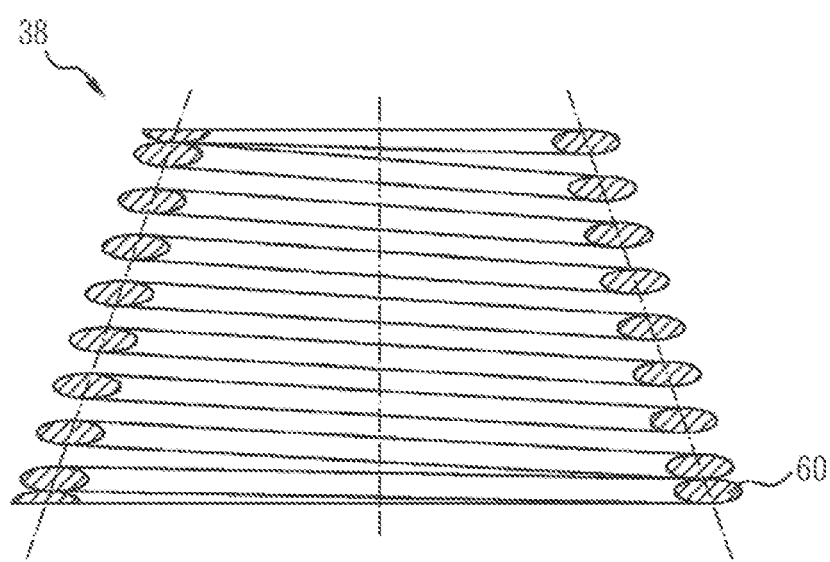
FIG. 16 is a longitudinal sectional illustration through a spiral spring arrangement which is formed as a helical spring and which narrows conically along a longitudinal axis, according to teachings of the present disclosure.
Figure 17:
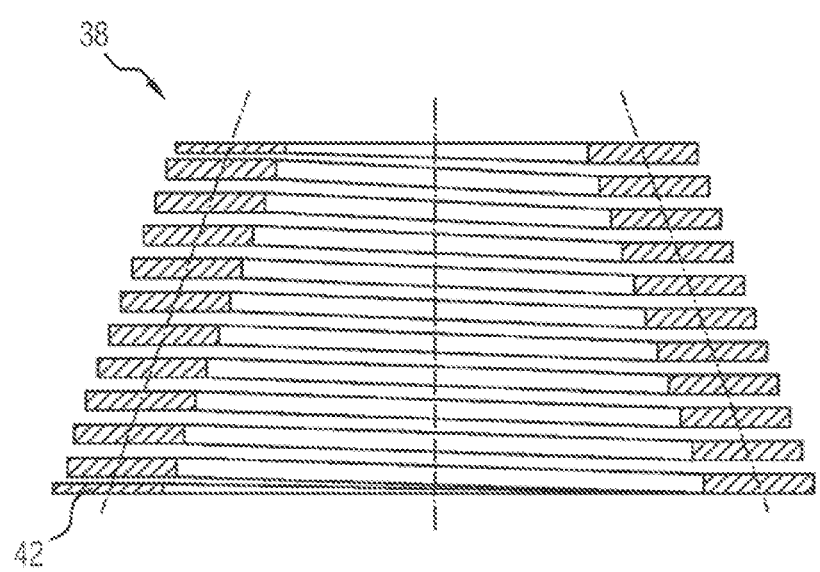
FIG. 17 is a longitudinal sectional illustration through a spiral spring arrangement which is formed as a corrugated spring ring and which narrows conically along a longitudinal axis, according to teachings of the present disclosure.

In some embodiments with a helical spring (cf. FIG. 16), the helical spring 60 tapers conically along its longitudinal axis 50. The same is self-evidently also possible with a corrugated spring ring 42 is illustrated in longitudinal section in FIG. 17. In the case of a conical spiral spring arrangement 38 being used, centering in the installation space, that is to say in the damper volume 24, can be realized by means of one end of the spiral spring arrangement.

What is claimed is:

1. A high-pressure fuel pump comprising:
a low-pressure region with a low-pressure damper for damping pressure pulsations that occur during the operation of the high-pressure fuel pump;
wherein the low-pressure damper has a damper volume;
a damper capsule contained in the damper volume, the damper capsule including a gas volume enclosed between two membranes; and
a spiral spring enclosed in the damper volume outside the damper capsule for imparting a compressive preload force to at least a region of the damper capsule;
wherein the damper capsule has a gas volume region of lenticular form accommodating the gas volume enclosed between the membranes;
a connecting projection encircles the gas volume region;

the two membranes are connected to one another in gas-tight fashion; and the spiral spring for imparting the compressive preload force is arranged on the connecting projection.

2. The high-pressure fuel pump as claimed in claim 1, wherein:

the spiral spring comprises a helical spring with multiple concentrically arranged windings; and the helical spring narrows conically along a longitudinal axis of the spiral spring.

3. The high-pressure fuel pump as claimed in claim 1, wherein:

the spiral spring comprises a helical corrugated spring ring with multiple concentrically arranged windings;

some of the multiple windings have a corrugated form with at least two corrugation peaks and at least two corrugation troughs; and two of the multiple windings arranged at respective ends along a longitudinal axis of the corrugated spring ring are formed without a corrugated form.

4. The high-pressure fuel pump as claimed in claim 3, wherein:

adjacent windings of the multiple windings form lenticular passage openings at an outer circumferential surface of the corrugated spring ring, along the longitudinal axis of the corrugated spring ring, adjacent windings of the multiple windings are arranged such that corrugation peaks of a first winding are arranged on the corrugation troughs of a second winding and/or corrugation troughs of the first winding are arranged on the corrugation peaks of the second winding.

5. The high-pressure fuel pump as claimed in claim 1, wherein a spiral spring inner diameter corresponds to a gas volume region diameter.

6. The high-pressure fuel pump as claimed in claim 1, wherein at least one centering winding of the spiral spring for centering the spiral spring arrangement in the damper volume has an outer diameter corresponding to a damper volume inner diameter.

7. The high-pressure fuel pump as claimed in claim 6, wherein the at least one centering winding comprises a ring-shaped disk connected concentrically to a winding of the spiral spring.

8. The high-pressure fuel pump as claimed in claim 6, wherein the at least one centering winding includes cutouts arranged on an outer circumference forming at least three contact circle segments for making contact with a damper volume delimiting wall.

9. The high-pressure fuel pump as claimed in claim 1, further comprising a single centering winding arranged on the spiral spring along a longitudinal axis arranged in the center thereof.

10. The high-pressure fuel pump as claimed in claim 1, further comprising two centering windings arranged at respective ends of the spiral spring, along a longitudinal axis.

11. A high-pressure fuel pump comprising:

a low-pressure region with a low-pressure damper for damping pressure pulsations that occur during the operation of the high-pressure fuel pump;

wherein the low-pressure damper has a damper volume;

a damper capsule contained in the damper volume, the damper capsule including a gas volume enclosed between two membranes; and a spiral spring enclosed in the damper volume outside the damper capsule for imparting a compressive preload force to at least a region of the damper capsule;

wherein at least one centering winding of the spiral spring for centering the spiral spring arrangement in the damper volume has an outer diameter corresponding to a damper volume inner diameter; and the at least one centering winding comprises a ring-shaped disk connected concentrically to a winding of the spiral spring.

12. The high-pressure fuel pump as claimed in claim 11, wherein the at least one centering winding includes cutouts arranged on an outer circumference forming at least three contact circle segments for making contact with a damper volume delimiting wall.

* * * * *